W. H. THIEMER.
VEHICLE SPRING LUBRICATOR.
APPLICATION FILED AUG. 5, 1916.
1,329,642.
Patented Feb. 3, 1920.
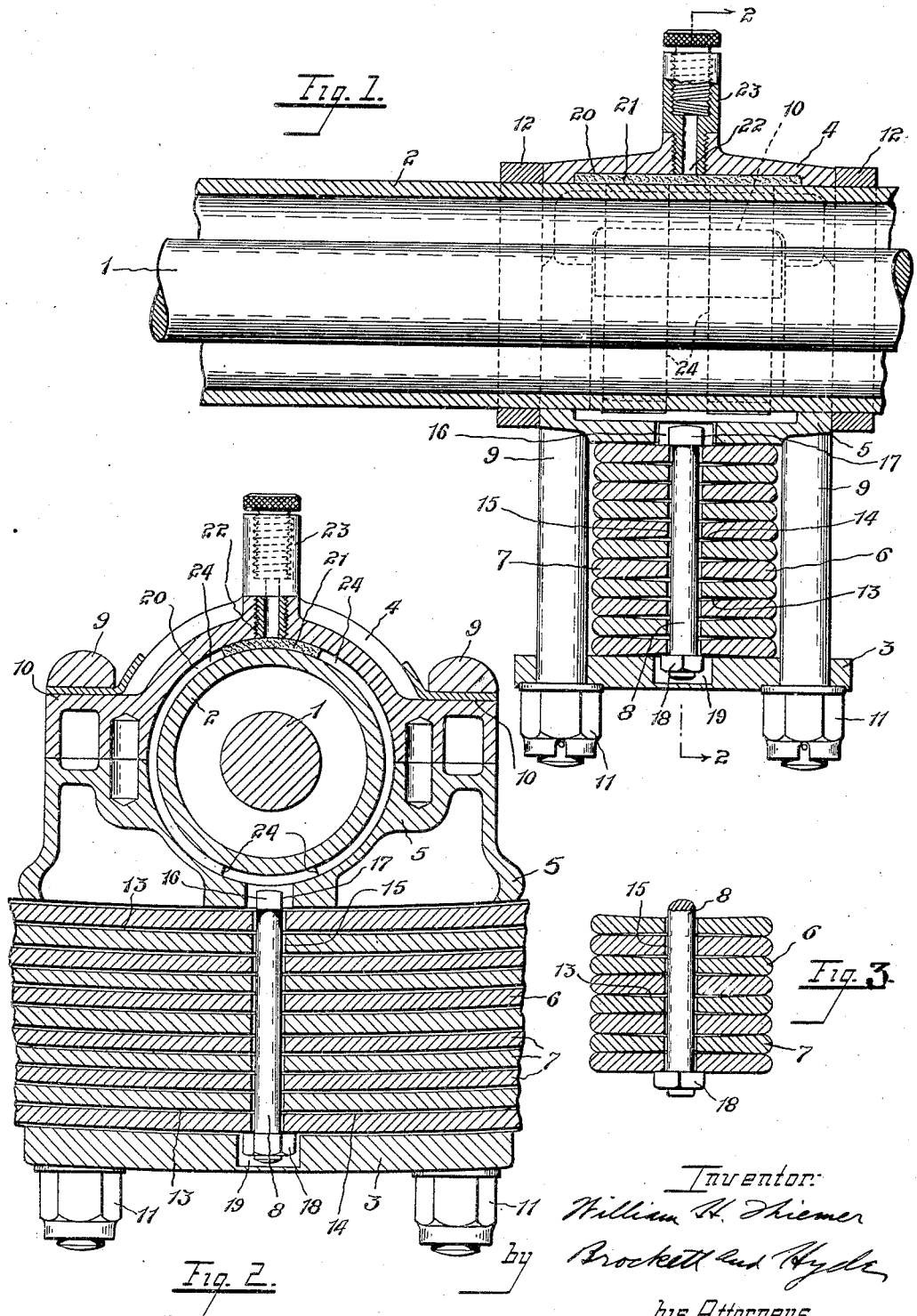
Inventor:
William H. Thiemer
by Brockett and Hyde
his Attorneys.

UNITED STATES PATENT OFFICE.

WILLIAM H. THIEMER, OF CLEVELAND, OHIO, ASSIGNOR TO THE WINTON COMPANY, OF CLEVELAND, OHIO, A CORPORATION OF OHIO.

VEHICLE-SPRING LUBRICATOR.

1,329,642.   Specification of Letters Patent.   Patented Feb. 3, 1920.

Application filed August 5, 1916. Serial No. 113,318.

*To all whom it may concern:*

Be it known that I, WILLIAM H. THIEMER, citizen of the United States, residing at Cleveland, in the county of Cuyahoga and State of Ohio, have invented certain new and useful Improvements in Vehicle-Spring Lubricators, of which the following is a specification.

This invention relates to vehicle springs and more particularly to lubricators therefor.

The object of the invention is to provide simple and improved means for conducting lubricant to and distributing it between the leaves of the spring, and which means is so arranged as to enable the lubricant supply to be renewed from time to time without disassembling or loosening the spring or its shackle bolts. A further object of the invention is to provide lubricating means which can be readily adapted to all the usual types or forms of springs with little or no modification of the usual parts, and which thoroughly lubricates the spring leaves with a minimum amount of attention by the user.

Further objects of the invention are in part obvious and in part will appear more in detail hereinafter.

In the drawings, Figure 1 represents a central longitudinal sectional elevation through a rear axle provided with the invention; Fig. 2 is a cross section on the line 2—2, Fig. 1, looking in the direction of the arrows; Fig. 3 is a detail cross section, showing a modification.

Referring to the drawings, 1 indicates a rear vehicle axle surrounded by the hollow casing 2. The spring seat comprises a flat base 3 and a cap consisting of upper and lower members 4 and 5 meeting on a horizontal plane and which surround the casing 2. Between the base and cap is located the spring 6, the separate leaves 7 of which are held in assembled relation by a bolt 8, so that the spring as a whole can be removed from its seat, and which spring is also secured to its seat by the U-shaped shackle bolts 9, whose heads pass over flanges or shoulders 10 on the upper cap member, and whose lower free ends are provided with nuts 11 below the base 3. The cap lies between two collars 12 riveted or otherwise secured to the casing. This is the usual assembly for the rear axle spring.

In the present invention the spring leaves are provided with horizontal slightly concave faces, so as to form shallow chambers 13 extending longitudinally between the meeting faces of adjacent spring leaves and substantially from edge to edge thereof. These chambers may be provided in several ways, for example, by forming either the upper or lower face, or both faces, of each leaf with a shallow concavity 14, as in Fig. 1, or, if desired, alternate leaves may be provided with flat parallel upper and lower faces and concave upper and lower faces, as in Fig. 7. Any of these arrangements will provide a longitudinal chamber between each two adjacent leaves. The shallow concavities are formed in the spring leaves at the time of rolling the same and their gradually varying contour in cross section makes them easy to construct and does not impair their strength or interfere with the tempering operation, which is the case when a spring leaf is formed with a marked or sharply pronounced groove or channel.

It will, of course, be understood that successive leaves, as is usual, are of different lengths and may extend in either or both directions from the securing bolt 8. Said bolt passes through a series of registering openings 15 in the several leaves, which openings together form a cross groove or channel establishing communication between the several longitudinal chambers 13. The head 16 of the bolt lies in a through opening in the lower portion 5 of the cap, and is flattened off on two sides, as at 17, to establish communication from the upper face of the bolt head to the opening 15 in the upper spring leaf. The nut 18 on the lower end of the bolt lies in a recess 19 of the base 3 and is so formed as to close or seal the peripheral edges of the opening 15 in the bottom spring leaf and prevent escape of lubricant around said nut.

The two members of the cap of the spring seat are hollowed out to provide a chamber 20, in the upper portion of which is a suitable wick 21 extending longitudinally of the casing and lying beneath an opening 22 in the upper cap member 4, into which may be threaded a closing plug or a suitable oil cup 23. The upper and lower member of the cap are preferably also provided with inwardly extending lugs or projections 24 which form bearings for the casing 2 and assist in supporting the load.

The supply from the cup 23 flows down to the wick 21 and is distributed longitudinally of the casing to the joints between the cap 4, 5 and collars 12. The spring cap usually has a slight turning motion on the casing 2 which requires slight lubrication of said joints. The oil also flows down through the chamber 20 and past the head 16 of the securing bolt 8 to the channel formed by the openings 15, from which it is distributed to the several longitudinal chambers 14 between adjacent spring leaves, thereby thoroughly lubricating the same and enabling additional lubricant to be supplied to the spring without disassembling the same or loosening it in its seat. The opening through the bottom spring leaf is tightly sealed by the nut 18, so that no lubricant can escape except through the longitudinal distributing chambers 14.

The lubricant for the spring may be readily applied by feeding the oil cup, or by squirting the oil directly into the opening in which said oil cup is threaded. The lubricant is conducted to and distributed thoroughly along the longitudinal chambers between the faces of adjacent spring leaves, so that the entire spring is thoroughly lubricated and operates without squeak and also has a longer life.

It is also to be noted that by concaving the faces of the spring leaves they contact with each other only along lines at their edges, which reduces surface contact and produces a more responsive spring with a quicker rebound and increased reaction to distortion.

It will of course be understood that the invention is not limited to the precise forms shown in the drawings, but covers considerable modification and variation in the details of the parts within the scope of the claims appended hereto.

What I claim is:—

1. A vehicle spring having a plurality of superposed leaves, some faces of which are slightly concave to form a chamber between adjacent leaves and extending substantially from edge to edge thereof, said leaves being also provided with registering openings forming a channel transverse to said faces, a seat for said spring comprising a cap lying above and a base lying below the spring, said cap being circular in cross section and provided with a circumferential chamber on its inner face communicating with said channel.

2. A vehicle spring having a plurality of superposed leaves, some faces of which are slightly concave to form a lubricating chamber between adjacent leaves and extending substantially from edge to edge thereof, said leaves being also provided with registering openings forming a lubricating channel transverse to said faces, a seat for said spring comprising a cap lying above and a base lying below the spring, said cap being circular in cross section and provided with a circumferential lubricating chamber on its inner face, and means for supplying lubricant to said chambers.

In testimony whereof I affix my signature.

WILLIAM H. THIEMER.